Dec. 12, 1944.         J. J. HEIGL ET AL         2,364,975
DETERMINING PERMEABILITY OF GEOLOGIC STRUCTURES
Filed Dec. 28, 1939
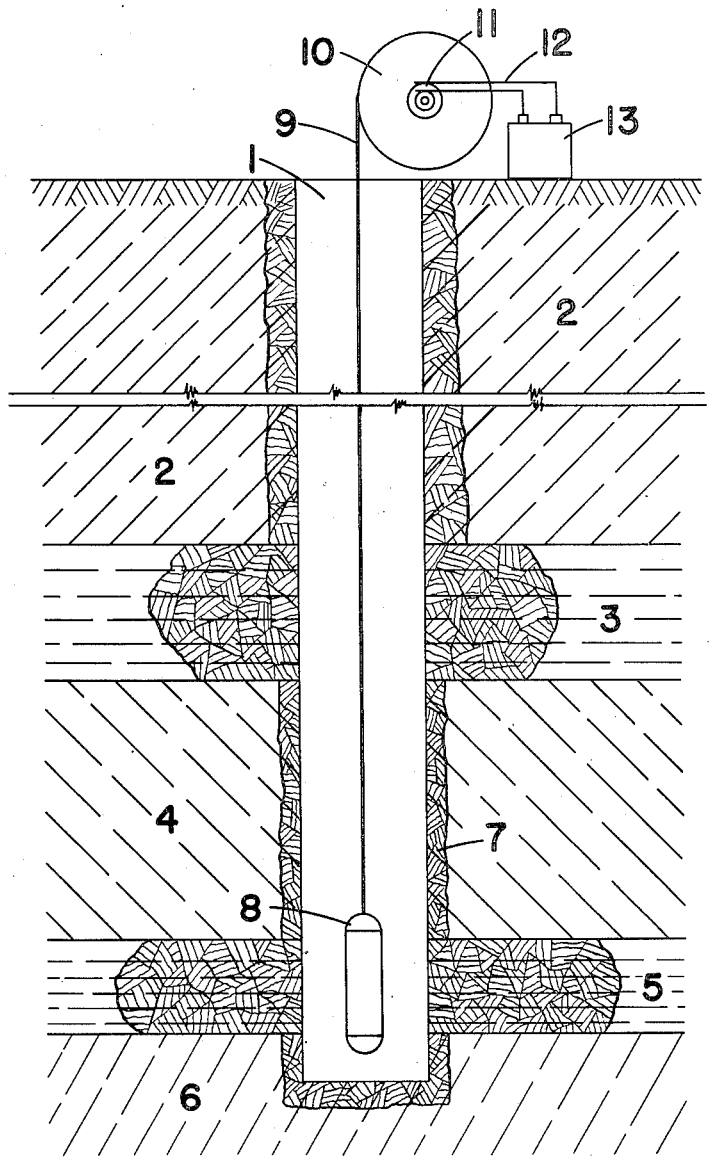
John J. Heigl
Louis R. Hodell   INVENTOR.
BY
         ATTORNEY.

Patented Dec. 12, 1944

2,364,975

UNITED STATES PATENT OFFICE 2,364,975

DETERMINING PERMEABILITY OF GEOLOGIC STRUCTURES

John J. Heigl and Louis R. Hodell, Tulsa, Okla., assignors to Standard Oil Development Company, a corporation of Delaware Application December 28, 1939, Serial No. 311,370

6 Claims. (Cl. 250—83.6)

The present invention relates to the use of radio-active materials for determining the permeability of formations penetrated by bore holes.

In the drilling of bore holes for the production of fluid from geologic reservoirs it is common to use drilling fluids. These drilling fluids, or drilling muds as they are often called, may be made up from a number of combinations of materials. Generally speaking, drilling fluids are colloidal systems containing finely divided solids suspended in a liquid. Originally, it was customary to use a water suspension of the cuttings taken from the hole as the drilling fluid, but in recent years various modifications have been used. For example, weighting materials, such as iron oxide and barites may be added to the drilling fluid, chemical agents to aid in suspending the solids may also be added and, in addition, on occasions oil instead of water has been used for the liquid in the mixture.

The use of various combinations of materials in drilling fluids is due principally to the number of functions these materials perform. The drilling fluid serves to lubricate the drill stem and bit used in the drilling, it serves to carry cuttings from the bottom of the hole to the surface of the earth, and, in addition, it forms a coating on the wall of the hole to prevent the exchange of fluids between the formations penetrated and the bore hole. The mud coating formed on the wall of the hole is in the nature of a filter cake formed by the deposit of weighting materials on the wall of the hole when liquid forming the base of the drilling fluid penetrates into adjacent formations. Needless to say, in deep bore holes the column of drilling fluid exerts a tremendous pressure upon the formations as they are being penetrated, because the pressure of the static head of the column may be thousands of pounds per square inch in a deep well. This enormous pressure forces the drilling fluid back into the formations, the amount of fluid being lost in this way being a function of the porosity and permeability of the formations.

It will be appreciated that some geologic structures are more permeable to drilling fluids than other structures and also that the permeability of various drilling fluids varies with the compositions. The problem of the permeability of formations is a troublesome one in several respects. Large amounts of drilling fluid may flow into permeable formations and cause substantial financial loss as the weighting materials added to drilling fluids are often expensive. On the other hand, it is difficult to make adjustments with respect to the formations giving trouble in order to eliminate the losses because the operator is located at the surface of the earth and up to the present time has had no convenient means for determining the permeability of the various strata penetrated by the bore hole. It will therefore be seen that in the drilling of wells involving the use of drilling fluids it would often be desirable to determine the penetration of the drilling fluids into the subsurface formations.

It is an object of the present invention to use drilling fluids containing radio-active materials in drilling bore holes in order to determine the permeability of the subsurface structure penetrated by the bore hole.

Other objects and advantages of the present invention may be seen from reading the following description and by reference to the accompanying drawing in which the sole figure is a transverse sectional view of an earth formation which had been penetrated by a bore hole drilled with the use of a radio-active drilling fluid. The permeability of the various strata penetrated by the bore hole is to be detected in accordance with the present invention.

Referring specifically to the drawing, a bore hole 1 penetrates the earth formation comprising strata 2, 3, 4, 5 and 6. Drilling fluid having radio-active characteristics which has penetrated into the earth formations is designated by numeral 7.

An instrument for detecting radio-active materials by an electronic method is shown as 8 being suspended in bore hole 1 by means of a conducting cable line carried by reel 10. Slip ring 11 attached to the reel 10 allows conductor 12 to connect the cable with a suitable indicating or recording instrument shown generally at 13.

As may be seen in the drawing, the permeability of the different strata of the formation penetrated by the bore hole varies with the different strata encountered. The cross-sectional view of the formation in the drawing is for illustrative purposes only and is not intended to portray any actual formation, but, as shown in this drawing, strata 2, 4 and 6 have a relatively small amount of porosity and strata 3 and 5 have substantial amounts of porosity.

It will be understood that in drilling bore hole 1 conventional methods are used involving the use of a drilling fluid. Such methods have not been described and illustrated because they are well known to the art. In drilling the hole, the drilling fluid is made radio-active either by the addition of radio-active material thereto or else by subjecting the drilling fluid itself to radio-active influences which, in turn, causes the material to produce radio-active emissions.

The instrument 8 which is employed for detecting the radio-active emissions and recording or indicating instrument 13 may be any of several which are well known to the art. For example, an ionization chamber may be incorporated in instrument 8, or a Geiger counter or Geiger counters arranged in pairs may be incorporated in this instrument and electrically connected through cable 9 and conductors 12 to a suitable indicating instrument 13. The use of such devices for indicating the presence of radio-active materials is well known to the art and is shown in U. S. Patent No. 2,133,776 and in copending application Serial No. 224,504 filed August 12, 1938 in the name of Lynn G. Howell. Actual construction of such instruments forms no part of the present invention and since descriptions of them are available elsewhere, no further description of them will be given in the present application.

It will be evident from the above description that the filter cake formed in the bore hole during the drilling operation will extend along the entire bore of the hole and will have radio-active characteristics. However, those portions of the bore hole passing through the more permeable formations will have greater quantities of radio-active materials deposited adjacent thereto because greater amounts of radio-active materials will penetrate into these formations than will penetrate into the less permeable formations. This is clearly shown in the drawing in which the more permeable formations 3 and 5 have had drilling fluid penetrating into them to a much greater depth than had the other formations.

As mentioned above the drilling fluid may be made radio-active either by adding a natural radio-active substance to the drilling fluid or else by producing the radio-active influences in the drilling fluid itself without the addition of extraneous material. We prefer to render the drilling fluid radio-active by the addition of carnotite or pitchblende. It will be understood that in producing radio-active characteristics in the drilling fluid the amount of these characteristics must be regulated in order that comparative results may be obtained between the various strata. In other words, enough radio-active material must be present to operate the indicator at a commerically desirable travel in the bore hole of, say, 20 feet per minute and, on the other hand, the material present must not produce emissions at too high a rate.

By determining the permeabilities of the strata penetrated by a bore hole in accordance with the above described method, several improvements in the drilling of bore holes may be obtained. For example, if there appears to be an unnecessary loss of drilling fluid in a bore hole, the location of this loss may be readily determined by the greater concentration of radio-active materials at this point than at other places in the bore hole and the composition of the drilling fluid may then be altered to overcome this loss. Then, too, in developing fields the permeability of the various formations penetrated by bore holes in reaching production may be readily determined in the first wells drilled in developing the field and in the subsequent bore holes drilled the characteristics of the drilling fluid may be altered from time to time in order to reduce losses of drilling fluid to the formations.

Having fully described and illustrated our invention, what we desire to claim is:

1. A method for determining the permeability of the various strata penetrated by a bore hole comprising the steps of incorporating radio-active material with drilling fluid used in drilling the bore hole and subsequently using an electronic method to determine the concentration of the radio-active material along the bore of the hole.

2. A method for determining the permeability of the formations penetrated by a bore hole comprising the steps of rendering radio-active the drilling fluid used in drilling a bore hole and subsequently determining the concentration of the radio-active material along the bore of the hole.

3. A method for determining the permeability of the formations penetrated by a bore hole comprising the steps of using a drilling fluid containing finely divided carnotite in drilling the bore hole and subsequently passing an instrument along said bore hole to determine the variations in concentration of radio-active material along the bore of said hole.

4. In a radiological method for logging boreholes the steps of drilling a borehole while circulating therein a drilling fluid containing a radioactive material, thereby causing the formation of a sheath on the walls of the borehole, lowering into the borehole a detector sensitive to radioactive phenomena, and indicating the response of said detector to the effect of the radioactive material incorporated in said sheath.

5. In a method for investigating the permeability of strata in a borehole the steps of introducing into the borehole a liquid medium containing a radioactive tracer, forcing said material into the strata to be investigated, lowering a detector of radioactive material into the borehole and locating the strata to be investigated by the responses of said detector to the presence of said radioactive tracer in said strata.

6. A method for investigating the permeability of a stratum traversed by a borehole which comprises forcing a radioactive substance into the stratum to be investigated and thereafter passing a detector of said radioactive substance along the borehole to locate said stratum by the response of said detector to said radioactive substance.

JOHN J. HEIGL.
LOUIS R. HODELL.